(12) United States Patent
Hipwell et al.

(10) Patent No.: US 6,654,206 B2
(45) Date of Patent: Nov. 25, 2003

(54) DISC HEAD SLIDER WITH INTERMITTENT CONTACT PROTECTION FEATURE

(75) Inventors: Mary Cynthia Hipwell, Minneapolis, MN (US); Jason W. Riddering, Prior Lake, MN (US); Jorge V. Hanchi, Minneapolis, MN (US); Anthony P. Sannino, Shakopee, MN (US); Zine-Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 29 days.

(21) Appl. No.: 09/905,190

(22) Filed: Jul. 13, 2001

(65) Prior Publication Data

US 2002/0044384 A1 Apr. 18, 2002

Related U.S. Application Data

(60) Provisional application No. 60/218,268, filed on Jul. 13, 2000.

(51) Int. Cl.[7] ................................................ G11B 5/60
(52) U.S. Cl. .................. 360/236.6; 360/237; 360/254.7
(58) Field of Search ........................... 360/235.8, 236.6, 360/236.3, 237, 254.7, 255

(56) References Cited

U.S. PATENT DOCUMENTS

| 5,034,828 A | 7/1991 | Ananth et al. ................. 360/75 |
|---|---|---|
| 5,418,667 A | 5/1995 | Best et al. ................... 360/103 |
| 5,499,149 A | 3/1996 | Dovek ......................... 360/103 |
| 5,508,861 A | 4/1996 | Ananth et al. ............... 360/103 |
| 5,557,488 A | 9/1996 | Hamilton et al. ........... 360/104 |
| 5,625,512 A | 4/1997 | Smith .......................... 360/103 |
| 5,768,055 A | 6/1998 | Tian et al. ................... 360/103 |
| 5,841,608 A | 11/1998 | Kasamatsu et al. ......... 360/103 |
| 5,870,251 A | 2/1999 | Boutaghou ................... 360/103 |
| 5,898,540 A | 4/1999 | Maruyama et al. ......... 360/103 |
| 5,991,118 A | 11/1999 | Kasamatsu et al. ......... 360/103 |
| 6,212,042 B1 | 4/2001 | Gui et al. ................. 360/236.6 |
| 6,236,543 B1 * | 5/2001 | Han et al. ................. 360/236.6 |
| 6,441,999 B1 | 8/2002 | Tang et al. ............... 360/236.6 |
| 6,459,547 B1 | 10/2002 | Riddering et al. ........ 360/236.6 |
| 6,466,410 B2 | 10/2002 | Polycarpou et al. ..... 360/236.6 |
| 2002/0008939 A1 | 1/2002 | Boutaghou et al. ...... 360/235.8 |

OTHER PUBLICATIONS

U.S. patent application Ser. No. 09/686,038, Rao et al., filed Oct. 11, 2000.

* cited by examiner

Primary Examiner—Robert S. Tupper
(74) Attorney, Agent, or Firm—Westman, Champlin & Kelly, P.A.

(57) ABSTRACT

A slider having contact protection for ultra-low fly heights. The contact protection includes contact pads having an ultra-low height dimension to reduce friction and damage for intermittent contact for ultra-low fly height applications.

14 Claims, 4 Drawing Sheets

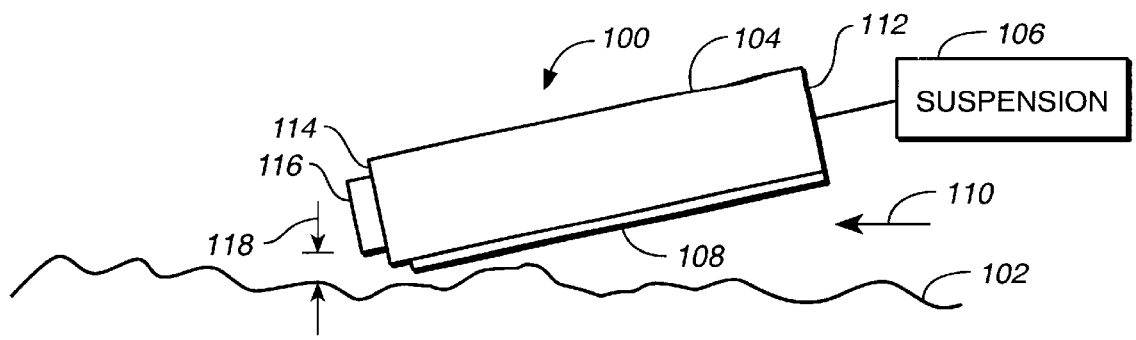
FIG._1
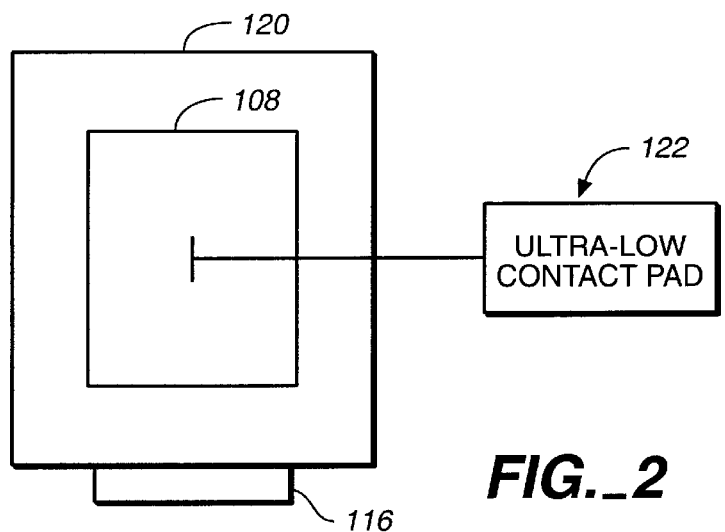
FIG._2
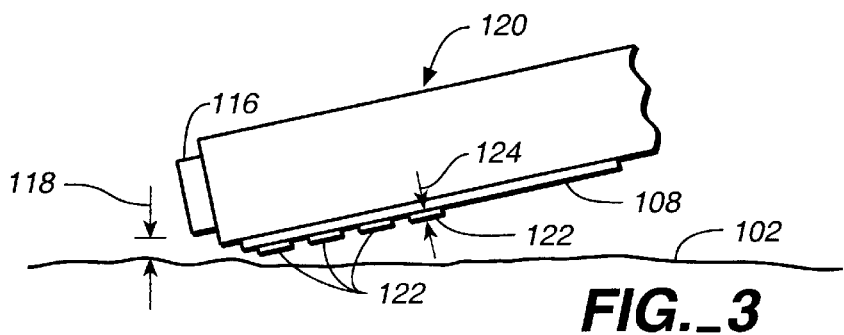
FIG._3

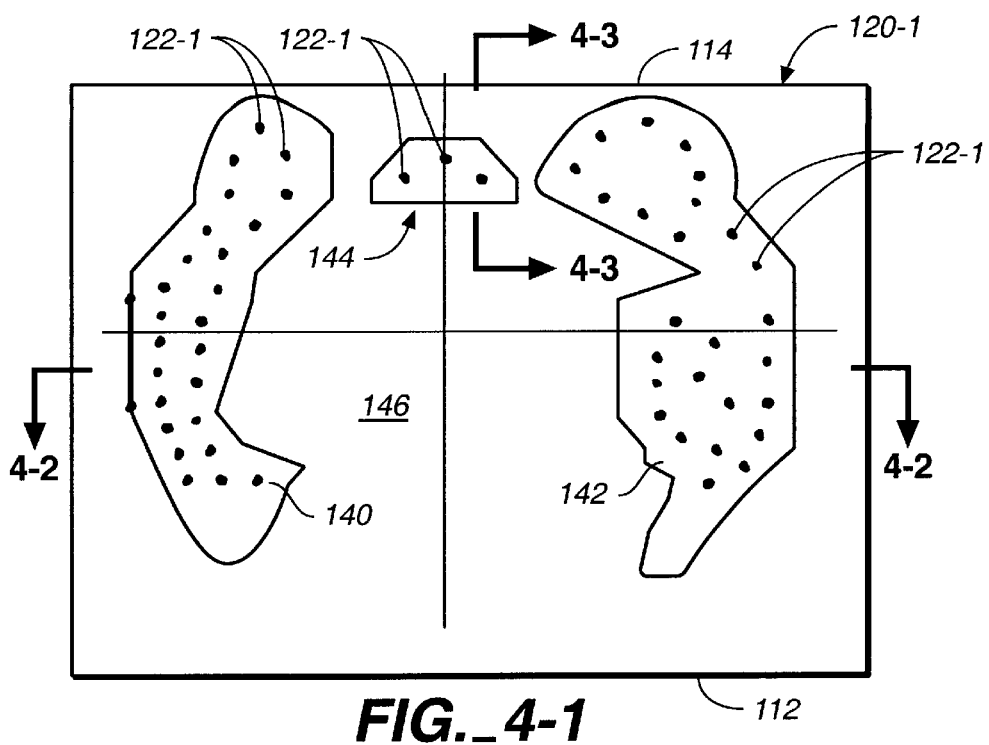
FIG._4-1
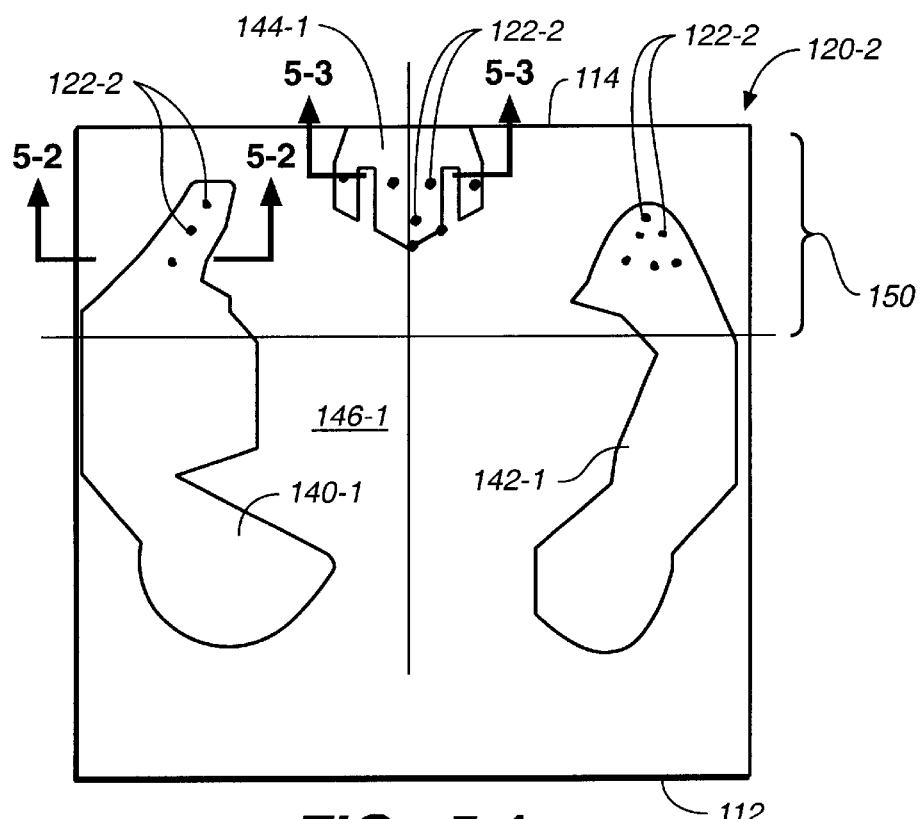
FIG._5-1

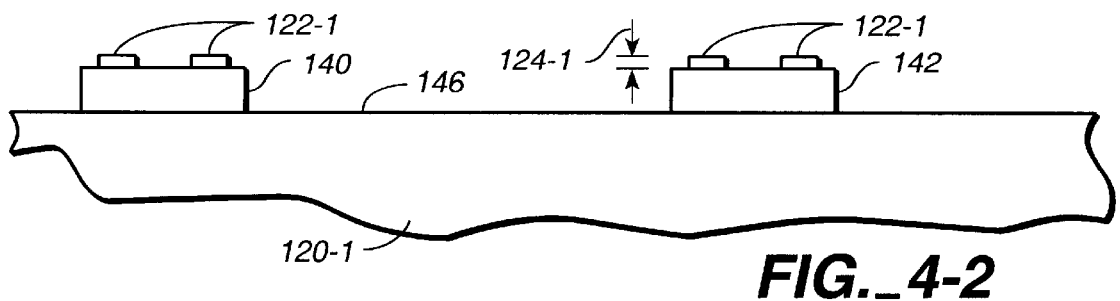
FIG._4-2
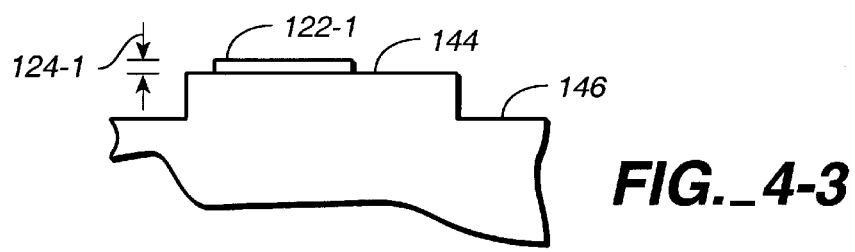
FIG._4-3
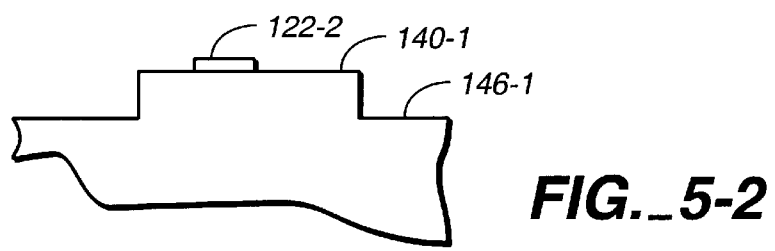
FIG._5-2
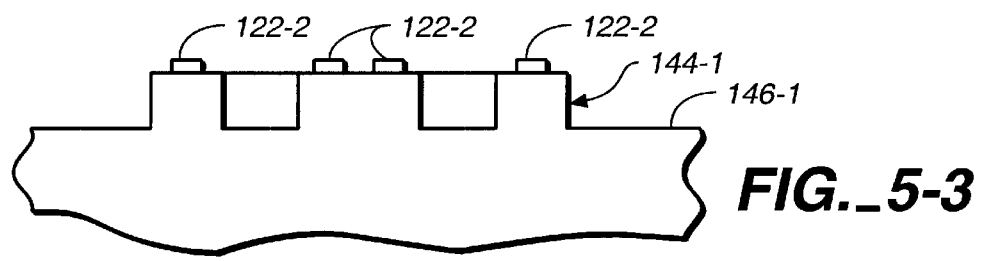
FIG._5-3

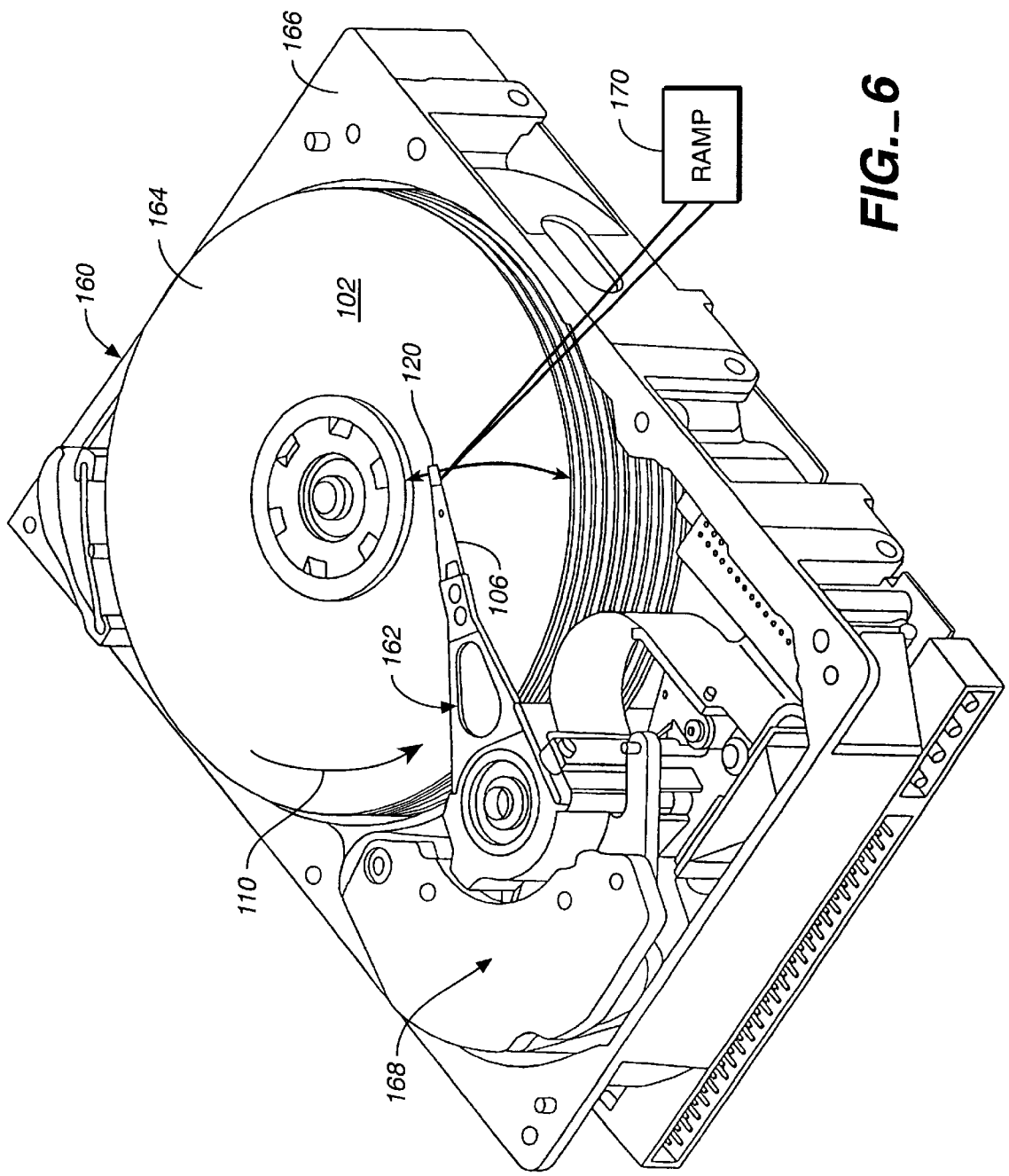
FIG._6

DISC HEAD SLIDER WITH INTERMITTENT CONTACT PROTECTION FEATURE

CROSS-REFERENCE TO RELATED APPLICATION

This application claims priority to Provisional Application Ser. No. 60/218,268 filed Jul. 13, 2000 and entitled "DIAMOND-LIKE CARBON PADS FOR FLYABILITY AT ULTRA-LOW FLY HEIGHTS".

FIELD OF THE INVENTION

The present application relates to a head structure for a disc head for a data storage device. In particular, the present invention relates to disc heads having contact pads for intermittent contact protection for ultra-low fly heights.

BACKGROUND OF THE INVENTION

Data storage devices store digital information on discs. Heads are supported relative to the disc surfaces to read information from or write information to the discs. Heads include a slider which is supported relative to the disc surface for read/write operations. The slider is coupled to the suspension assembly supported by an actuator assembly which moves under operation of a voice coil motor. The slider is coupled to the suspension assembly to form a head suspension assembly. The slider is coupled to the suspension assembly through a gimbal spring which allows the head to pitch and roll to follow the topography of the disc surface. Discs are rotated for operation via a spindle motor. Rotation of the disc creates an air flow along an air bearing surface of the slider from a leading edge to a trailing edge of the slider. Air flow along the air bearing surface of the slider creates a hydrodynamic lifting force so that the head or slider essentially flies above the disc surface for proximity or near proximity recording.

During operation, the slider can intermittently contact the disc surface due to vibration or excitation of the head or intermittent contact with aperities on the disc surface. Contact between the slider and disc surface can damage the head and disc surface as well as interfere with read-write signals. Areal disc drive density is increasing and fly heights of the slider above the disc surface are decreasing. Decreases in fly height parameters increases intermittent head-disc contact due to reductions in head-disc spacing. Disc surfaces are fabricated with a lower surface roughness to accommodate lower fly heights of the slider.

Smoother disc surface can increase friction and stick slip introduced as a result of intermittent contact between the slider and disc surface which interferes with and/or degrades read/write operations of the disc drive. As track spacing decreases and fly height decreases, small perturbation to the head flying dynamics can have a larger impact on read/write signals as a result of contact interface between the slider and disc surface and reduced head-disc spacing. These and various other features as well as advantages which characterize the present invention will be apparent upon reading the following detailed description and review of the associated drawings.

SUMMARY OF THE INVENTION

The present invention relates to a slider having intermittent contact protection for ultra-low fly heights. The contact protection includes contact pads having an ultra-low height dimension for ultra-low fly height applications. The contact pads reduce contact interface or friction without interference with ultra-low slider fly heights. These and various other features as well as advantages which characterize embodiments of the present invention will be apparent upon reading the following detailed description and review of the associated drawings.

BRIEF DESCRIPTION OF THE DRAWINGS

FIG. 1 is schematic illustration of a head supported relative to a disc surface.

FIG. 2 is a schematic illustration of a slider including at least one ultra-low contact pad for intermittent contact interface for ultra-low fly height applications.

FIG. 3 is a schematic illustration of an air bearing including the ultra-low contact pads for intermittent contact interface for ultra-low fly height applications.

FIG. 4-1 illustrates one embodiment of a slider including a plurality of dispersed contact pads for intermittent contact interface for ultra-low fly height applications. 4-1.

FIG. 4-2 is a cross-sectional illustration along lines 4-2—4-2 of FIG. 4-1

FIG. 4-3 is a cross-sectional illustration along lines 4-3—4-3 of FIG. 4-1.

FIG. 5-1 illustrates one embodiment of a slider including a plurality of contact pads at a trailing edge portion of the slider for intermittent contact interface for ultra-low fly height applications.

FIG. 5-2 is a cross-sectional illustration along lines 5-2—5-2 of FIG. 5-1.

FIG. 5-3 is a cross-sectional illustration along lines 5-3—5-3 of FIG. -5-1.

FIG. 6 is a perspective illustration of a data storage device including a load/unload ramp for supporting an ultra-low fly height slider for disc drive operations.

DETAILED DESCRIPTION OF ILLUSTRATIVE EMBODIMENTS

FIG. 1 schematically illustrates a head 100 supported above a disc surface 102 for reading data from or writing data to the disc surface 102. As schematically illustrated, the head 100 includes a slider 104 which is supported relative to the disc surface 102. The slider 104 is coupled to a suspension assembly 106 illustrated schematically which supplies a load force to the slider 104 during operation. The suspension assembly 106 is coupled to an actuator (not shown) to move the slider 104 or head relative to the disc surface for read-write operations.

The slider 104 includes an air bearing including at least one raised bearing surface 108. As illustrated by arrow 110, rotation of disc 102 creates an air flow along the air bearing surface 108 of the slider 104 to provide a hydrodynamic lifting force to support the slider above the disc surface 102 for read/write operation as shown. In particular, for operation, air flows as illustrated by arrow 110 between a leading edge 112 and a trailing edge 114 of the slider to provide the hydrodynamic lifting force.

Transducer elements 116 illustrated diagrammatically are supported at the trailing edge 114 of the slider 104 for read/write operations. Transducer elements 116 can be inductive-type transducer elements, magnetoresistive transducer elements or magneto-optical transducer elements. For spin-up, power is supplied to rotate disc 102 to a steady state operating or rotation mode. Rotation creates the hydrodynamic lifting force which is countered by the load force supplied to the slider by the suspension 106. At steady state operation or rotation, the transducer element 116 is supported at a fly height dimension 118 elevated above the disc surface 102 defined in part by the hydrodynamic lifting force on the air bearing surface 104 of the slider and the load force supplied by the suspension 106.

Disc drive areal density is increasing demanding lower fly heights 118 for read/write operations. Lower fly heights reduces head disc spacing parameters and the glide avalanche break point (GABP). The GABP is a measure of the height of the surface topography of the mean surface of the disc. Below the GABP, a data or recording head will have massive contacts with the disc surface. To accommodate lower fly heights, the surface roughness or GABP of the disc surface must be relatively low to limit contact interference of the head at lower fly heights. Protrusions or roughness on the slider can also interfere with fly height reductions of the slider.

During operation, the slider can intermittently contact the disc surface due to excitation of the head or suspension or contact with asperities on the disc surface. The propensity of intermittent contact increases for lower fly heights. As previously discussed, the surface roughness or GABP of the disc surface is lower for low or ultra-low fly height applications. The lower surface roughness increases contact friction at intermittent head-disc contact. Increased intermittent contact friction can degrade or increase modulation of read/write signals of the disc drive.

FIGS. 2–3 schematically illustrate an embodiment of a slider 120 for ultra-low fly height applications having an intermittent contact feature where like numbers are used to identify like parts in the previous FIGS. Slider 120 includes at least one contact pad 122 to reduce stiction or friction for intermittent head-disc contact for ultra-low fly height applications. The contact pad 122 reduces head-disc contact area to reduce interface stiction during intermittent contact. The intermittent contact pad 122 has a low height dimension 124 as illustrated in FIG. 3 to limit fly height interference for ultra-low fly height applications.

The ultra-low contact pad 122 includes a tribological material such as a diamond-like carbon to limit contact friction for intermittent contact. The tribological material limits damage to the head and disc surface for intermittent contact protection. The tribological interface of the contact pad 122 reduces perturbation or modulation of the read/write signals developed as a result of friction introduced through intermittent head-disc contact.

The ultra-low height dimension provides sufficient clearance for desired fly height parameters for read/write operations as illustrated in FIG. 3, in contrast to slider integrated landing pads (SLIP) to limit stiction for contact starts and stop (CSS). The height of the SLIPs for CSS must provide sufficient standoff from the disc surface to limit meniscus growth along the bearing surface. The large stand-off or height required for CSS landing pads interferes with ultra-low fly heights. The ultra-low height pad 122 has a low height dimension to limit fly height interference while providing intermittent contact protection. The ultra-low fly height dimension is about 100 Angstroms or less to provide intermittent contact protection for ultra-low fly heights.

FIGS. 4-1–4-3 schematically illustrate one embodiment of a slider 120-1 including ultra-low contact pads 122-1 where like numbers are used to identify like parts in the previous FIGS. Slider 120-1 includes an air bearing which in the illustrated embodiment of FIGS. 4-1, 4-2, 4-3 includes raised rails 140, 142 and center pad 144 elevated above a recessed bearing surface 146. Center pad 144 is positioned proximate to the trailing edge 114 of the slider 120-1. As shown ultra-low contact pads 122-1 are dispersed on an entire surface portion of rails 140, 142 and center pad 144 and extend from rails 140, 142 and center pad 144 to an ultra-low height dimension 124-1 to provide intermittent contact protection for ultra-low fly height applications as previously described.

FIGS. 5-1–5-3 illustrate another slider 120-2 embodiment where like numbers are used to refer to like parts in the previous FIGS. Slider 120-2 includes raised side rails 140-1, 142-1 and center pad 144-1 elevated above recessed bearing surface 146-1. In the illustrated embodiment side rails 140-1, 142-1 and center pad 144-1 include contact pads 122-2 dispersed at a trailing edge portion 150 of the slider 120-2 to provide protection where intermittent contact is likely to occur. Contact pads 122-2 dispersed at the trailing edge portion 150 provide contact interface to reduce contact friction and interference or modulation of the read/write signals of the disc drive.

During periods of non-operation, sliders can be supported on the disc surface for contact starts and stops (CSS) as previously discussed or supported on a ramp for ramp load/unload for operation. For CSS operation, the hydrodynamic lifting force must be sufficient to overcome stiction holding the slider to the disc surface. Typically, CSS sliders are supported on a roughened surface structure or the CSS sliders include integrated landing pads SLIP to reduce contact stiction for contact-starts and stops as previously discussed. Application of SLIP and/or roughened surface structures to reduce CSS stiction interferes with reduced ultra-low fly height applications or flyability at ultra-low fly heights as previously discussed. In a ramp load/unload system, the slider is supported above the disc surface which reduces stiction interface between the slider and disc surface without fly height interference in contrast to the SLIP or roughened surface structure of CSS operation while the contact pads 122 provide intermittent contact protection without significant fly height interference.

FIG. 6 illustrates a data storage device 160 including a head having a slider with ultra-low contact protection where like numbers are used to identify like parts. As shown, a plurality of heads are supported relative to discs for read/write operation. The heads are coupled to suspension assemblies 106-1 and the suspension assemblies 106-1 are supported by an E-block assembly 162. As illustrated by arrow 110, a disc stack 164 is supported for co-rotation relative to chassis 166 by a spindle motor (not shown in FIG. 6). E-block assembly 162 moves under power of a voice coil motor 168 to position heads relative to selected data tracks for read/write operations.

In the illustrated embodiment, heads are supported by an load/unload ramp 170 illustrated diagrammatically during non-operational periods to limit stiction between the ultra-low fly height slider and the disc surface. For spin-up, the head is unloaded from ramp 170 to fly above the disc surface for read/write operations via the hydrodynamic lifting force supplied by air flow along the bearing surface via disc rotation. The contact pads 122 on the slider limit friction during intermittent contact without significant interference with the ultra-low fly height dimension and the ramp 170 supports the slider off the disc surface during non-operational periods to provide non-operational stiction control without degrading flyability at ultra-low fly heights.

The present invention relates to a contact protection feature for ultra-low fly height applications. The contact protection feature includes contact pads (such as 122) having a relatively low height dimension 124 to limit interference at ultra-low fly heights while providing intermittent contact protection.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein, it will be appreciated by those skilled in the art that the teachings of the present invention can be applied to other systems without departing from the scope and spirit of the present invention.

What is claimed is:

1. A head comprising;
    a slider including a leading edge, a trailing edge, and at least one raised bearing surface between the leading edge and the trailing edge and the at least one raised bearing surface including a raised center portion proximate to a trailing edge portion of the slider;
    a transducer carried by the slider; and
    at least one contact pad on the raised center portion having a pad height dimension of about 100 Angstroms or less for ultra-low slider fly heights.

2. The head of claim 1 including a plurality of contact pads dispersed on the raised center portion.

3. The head of claim 1 including a plurality of contact pads formed of a diamond-like carbon material.

4. A head comprising:
    a slider including a leading edge, a trailing edge and raised bearing surfaces including raised side rails and a raised center pad;
    a transducer carried by the slider; and
    a plurality of contact pads on the raised side rails and the raised center pad having a pad height dimension of 100 Angstroms or less.

5. The head of claim 4 wherein the plurality of contact pads includes a plurality of contact pads dispersed on the raised side rails and a plurality of contact pads dispersed on the raised center pad.

6. The head of claim 4 wherein the plurality of contact pads includes a plurality of contact pads dispersed on a trailing edge surface portion of the raised side rails and a plurality of contact pads dispersed on the raised center pad.

7. An assembly for a data storage device comprising:
    a slider including a leading edge, a trailing edge and at least one raised bearing surface between the leading edge and the trailing edge;
    at least one contact pad on the at least one raised bearing surface having a pad height dimension of about 100 Angstroms or less; and
    a load/unload ramp adapted to support the slider during non-operational periods and configured to release the slider for operation.

8. The assembly of claim 7 wherein the at least one contact pad is formed of a diamond like-carbon.

9. The assembly of claim 7 wherein the at least one raised bearing surface includes raised side rails and a raised center pad and including a plurality of contact pads dispersed on the raised side rails and a plurality of contact pads dispersed on the raised center pad.

10. The assembly of claim 7 wherein the at least one raised bearing surface includes raised side rails and a raised center pad and including a plurality of contact pads a-re dispersed on the raised side rails and the raised center pad.

11. The assembly of claim 7 including a plurality of contact pads dispersed over an entire surface of the at least one raised bearing surface.

12. The assembly of claim 7, including a plurality of contact pads dispersed over a trailing edge portion of the at least one raised bearing surface.

13. The assembly of claim 7, wherein the at least one raised bearing surface includes raised side rails and a raised center pad and including a plurality of contact pads dispersed on a trailing edge portion of the raised side rails and the raised center pad.

14. The assembly of claim 7 wherein the at least one raised bearing surface includes raised side rails and a raised center pad including a plurality of contact pads dispersed on a trailing edge portion of the raised side rails and a plurality of contact pads on the raised center pad.

* * * * *

UNITED STATES PATENT AND TRADEMARK OFFICE
CERTIFICATE OF CORRECTION

PATENT NO. : 6,654,206 B2
DATED : November 25, 2003
INVENTOR(S) : Mary C. Hipwell et al.

It is certified that error appears in the above-identified patent and that said Letters Patent is hereby corrected as shown below:

Column 6,
Line 26, after "pads" delete "a-re".

Signed and Sealed this

First Day of June, 2004

JON W. DUDAS
*Acting Director of the United States Patent and Trademark Office*